(12) United States Patent
Mai

(10) Patent No.: US 10,402,779 B2
(45) Date of Patent: Sep. 3, 2019

(54) STANDALONE INVENTORY REORDERING SYSTEM

(71) Applicant: Xiao Ming Mai, East Brunswick, NJ (US)

(72) Inventor: Xiao Ming Mai, East Brunswick, NJ (US)

(*) Notice: Subject to any disclaimer, the term of this patent is extended or adjusted under 35 U.S.C. 154(b) by 0 days.

(21) Appl. No.: 15/646,459

(22) Filed: Jul. 11, 2017

(65) Prior Publication Data

US 2018/0053153 A1     Feb. 22, 2018

Related U.S. Application Data

(60) Provisional application No. 62/375,559, filed on Aug. 16, 2016.

(51) Int. Cl.
    *G06Q 10/08*     (2012.01)
    *G06Q 30/06*     (2012.01)

(52) U.S. Cl.
    CPC ..... *G06Q 10/0875* (2013.01); *G06Q 30/0633* (2013.01)

(58) Field of Classification Search
    CPC .................. G06Q 10/0875; G06Q 30/0633
    USPC ....................................................... 705/26.8
    See application file for complete search history.

(56) References Cited

U.S. PATENT DOCUMENTS

| | | |
|---|---|---|
| 6,486,778 B2 | 11/2002 | Mahler et al. |
| 8,924,262 B2 | 12/2014 | Shuster |
| 9,275,361 B2 | 3/2016 | Meyer |
| 2002/0128957 A1* | 9/2002 | Rosenberg .......... G07C 9/00111 705/37 |
| 2003/0023503 A1 | 1/2003 | Alling |
| 2004/0034581 A1 | 2/2004 | Hill et al. |
| 2004/0148256 A1 | 7/2004 | Bramnick et al. |
| 2005/0027603 A1 | 2/2005 | Green |

(Continued)

FOREIGN PATENT DOCUMENTS

| | | |
|---|---|---|
| CA | 2956160 A1 | 2/2016 |
| CN | 101849752 | 10/2010 |

(Continued)

OTHER PUBLICATIONS

Rubinstein, Ed, Operators Squelching Shrinkage with Cutting-Edge Liquor-Management, Oct. 6, 1997, Nation's Restaurant News, Lebhar-Friedman, Inc., 0028-0518, 0VCZ, p. 2. (Year: 1997).*

*Primary Examiner* — Jason B Dunham
*Assistant Examiner* — Brittany E Bargeon
(74) *Attorney, Agent, or Firm* — Weitzman Law Offices, LLC; Kenneth Weitzman; Daniel Douglas

(57) ABSTRACT

Methods, devices and systems for reordering an inventory item are provided herein. The device comprises a memory, a processor, and may comprise a sensor and/or a programming interface. The device receives and indication that an event occurred indicating that the inventory item has been used. The indication is received through a transceiver or through a sensor. The user programs a trigger threshold, and may program the device with a weighting factor for the triggering events or allow the device to calculate a weighting factor. The device automatically sends a signal when the number of triggering events calculated based on the weighting factor equals the trigger threshold. The indication may automatically reorder the inventory item or may send a message to the user requesting additional instructions.

18 Claims, 11 Drawing Sheets

(56) References Cited

U.S. PATENT DOCUMENTS

| | | |
|---|---|---|
| 2005/0180114 A1 | 5/2005 | Kaled |
| 2005/0190072 A1 | 9/2005 | Brown et al. |
| 2008/0183599 A1 | 7/2008 | Hill et al. |
| 2009/0146800 A1 | 6/2009 | Grimlund et al. |
| 2011/0090064 A1* | 4/2011 | Dahms ............... B64D 11/04 340/10.42 |
| 2013/0291099 A1* | 10/2013 | Donfried ............ G06Q 30/0637 726/22 |
| 2015/0041616 A1* | 2/2015 | Gentile ................ G06Q 10/087 248/550 |
| 2015/0073925 A1* | 3/2015 | Renfroe ............ G06Q 30/0641 705/15 |
| 2015/0278912 A1* | 10/2015 | Melcher ................ G06T 11/206 705/26.7 |
| 2016/0198246 A1* | 7/2016 | Gurumohan ............. H04Q 9/00 340/870.02 |
| 2016/0260161 A1* | 9/2016 | Atchley ................... E01H 5/12 |
| 2017/0206489 A1* | 7/2017 | Sirisilla ................ G06Q 10/087 |

FOREIGN PATENT DOCUMENTS

| | | |
|---|---|---|
| CN | 203490732 U | 3/2014 |
| WO | 2014210020 A1 | 12/2014 |
| WO | 2015195657 A1 | 12/2015 |

* cited by examiner

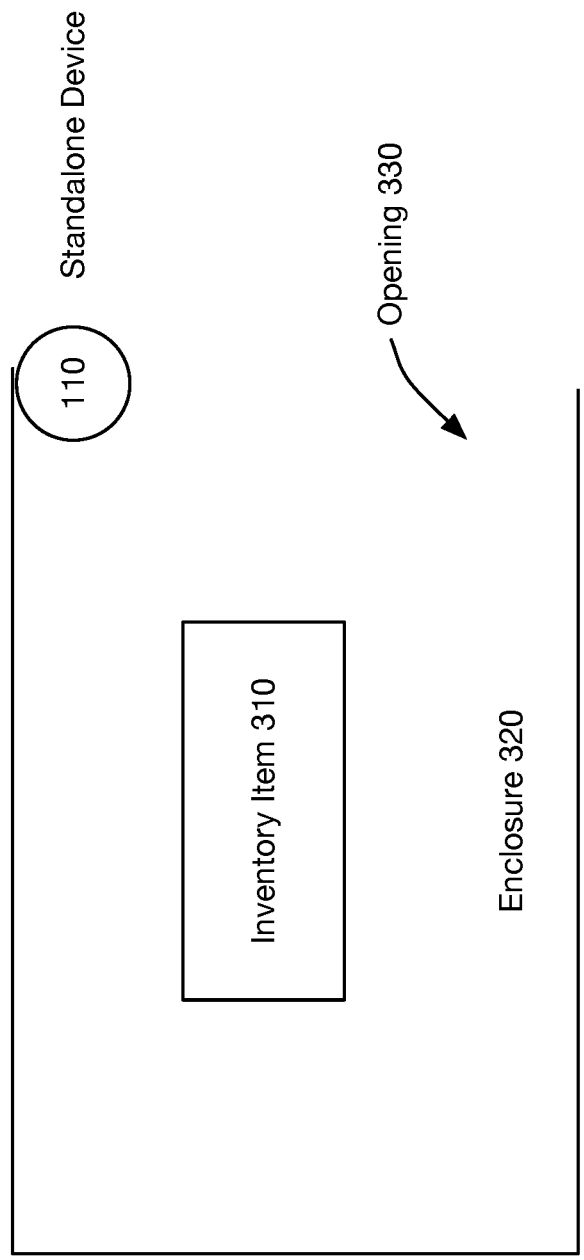

US 10,402,779 B2

STANDALONE INVENTORY REORDERING SYSTEM

CROSS-REFERENCE TO RELATED APPLICATION

This application claims the benefit of U.S. Provisional Application No. 62/375,559, filed Aug. 16, 2016, and also entitled "STANDALONE INVENTORY REORDERING SYSTEM," hereby incorporated by reference in its entirety.

BACKGROUND

This application relates to methods and systems for facilitating resupply orders for inventory items, including household consumable commodities and business inventory.

Currently, the most common methods of reordering fall into one of five general categories, each having limitations and drawbacks. The first category is scheduling periodic refill or reship orders based on a predicted usage. The notable drawback with this method is that reordering is based off a predicted usage, which monitors usage over an unacceptably long usage period such as month-to-month intervals. Such methods frequently cannot account for shorter periods so a user cannot depend on this method to overcome a "non-monthly need" to reorder. For example, consider needing to reorder a 12-can pack of soda. If, for example, a user consumes one can a day, reordering on a monthly interval is unsuitable because the number of days in a month is not divisible by the number of cans in a pack.

The second category is measuring consumption through an embedded device, such as an ink monitor in a printer, copier, or fax machine. This method faces the major drawbacks of failing to account for actual inventory in storage and the possibility of, or consumption of ink by multiple devices.

The third category is retail and shelf inventory monitoring software that uses purchase orders to track consumption. This method faces the drawback that usage calculations depend on software to monitor usage, depletion, and reordering of the inventory items, which may be error prone. Because of the potentially large amount of varying inventory (SKUs, part numbers, etc.), businesses typically close for a period of time to visually and physically check their inventory against their software counts.

The fourth category is sensors embedded in product packaging or an enclosure for storing an item. A drawback of this method is that it depends on the product manufacturer, retailer, or enclosure maker, to incorporate a device into the packaging, product, shipping container, or the like prior to sale. Another drawback is that the critical threshold point of when to reorder is not determined by the user. Another drawback is that the reorder thresholds are preset, and cannot be defined by the user.

The fifth category is devices having a button that is manually pressed to reorder a product. The manual nature of the reorder method is its major drawback because it requires manual user input. In addition to being less convenient than automatic reordering devices, manual systems, are also prone to accidental reordering. For example, the button may be pressed more times than is intended, or it may be pressed unintentionally by a person or accidentally by another object.

The present disclosure provides substantial improvements over current technologies as is further described herein.

SUMMARY

An improved method, apparatus and system for reordering an inventory item are disclosed herein. The improved apparatus disclosed herein is a standalone programmable device comprising a memory, processor, and transceiver. In alternate embodiments, the standalone device may also comprise any combination of one or more sensors and switches for detecting triggering events, programming interfaces, and display screens. During operation, the standalone device receives an indication of a triggering event. The indication may be a signal received through the transceiver. The term triggering event is used broadly within this disclosure to mean any movement or disturbance to an inventory item or its enclosure that is detected by the standalone reordering device. In an alternate embodiment the standalone device also comprises a sensor that is capable of detecting a triggering event, and can store the event in memory.

In one embodiment the standalone reordering device is used as follows. The user programs the device by defining a triggering threshold and a triggering value. A triggering value is a non-zero weighting factor that is assigned to each triggering event or some programmed set of triggering events. The standalone device receives an indication that a triggering event occurs either through a transceiver or from a sensor. The device may store the triggering event and as the number of triggering events accumulates, keeps track of a total event count. Using the assigned triggering value, the device calculates the total triggering record, which is the product of the total event count and the triggering value. When the total triggering record equals the trigger threshold, the apparatus sends a signal to a remote device.

In another embodiment of the method, the user sets a trigger threshold. The user then places the apparatus into an idle mode so that it will not transmit a signal, but can still record triggering events. The standalone device receives an indication that a triggering event occurs either through a transceiver or from a sensor, and stores the trigger event. When the inventory item is consumed, the user manually sends a reorder request using the device. The device then calculates a triggering value based on the trigger threshold and the trigger event count. The user then places the standalone device in an active mode such that it automatically sends a signal to a remote device when the total triggers recorded (i.e., the number of weighted triggering events recorded) equals the trigger threshold.

The standalone reordering device may also be used as part of a system. In one embodiment the system comprises a device that detects triggering events and a module within a second device. The first device comprises a sensor and a transceiver such that it senses triggering events and sends an indication when a triggering event occurs. The module in the second device may be an application or set of instructions within a remote device. A user can program the module by defining a trigger threshold and a triggering value. The module will automatically send an indication when the total triggers recorded equals the trigger threshold. In another embodiment, the module can be placed in an idle mode where it records the total event count but does not send a reorder signal. In this embodiment, the module calculates a triggering value when a user manually sends an indication. The calculation is based on the number of triggering events and the trigger threshold. The user then puts the module into an active mode so that it can automatically send a reorder signal when the total triggers recorded equals the trigger threshold.

BRIEF DESCRIPTION OF THE DRAWINGS

FIG. 3A is a block diagram illustrating an exemplary use of the standalone reordering device for practicing the methods describe herein;

DETAILED DESCRIPTION

Figure 1:
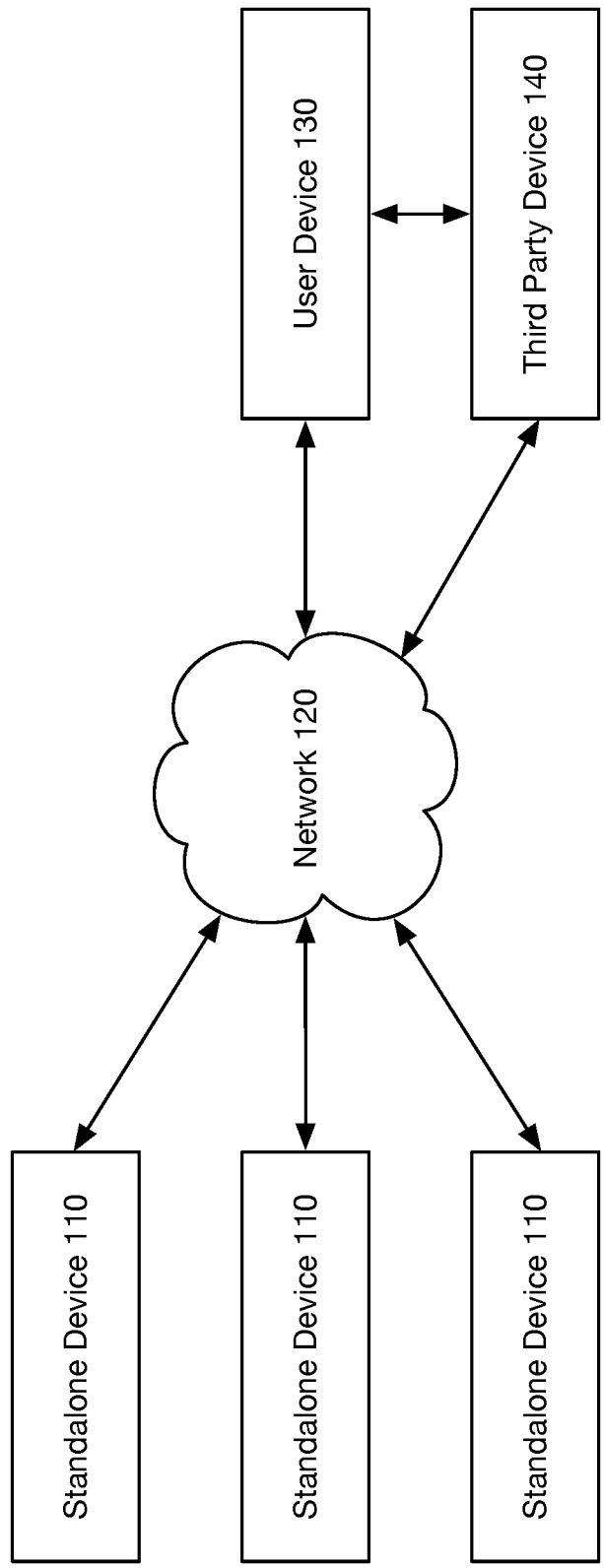
FIG. 1 is a block diagram of a system for performing one or more of the methods of the invention for standalone reordering of an inventory item described herein.

FIG. 1 is an exemplary embodiment of the system for carrying out one or more of the methods for standalone reordering of an inventory item. The system includes one or more standalone reordering devices 110. The standalone reordering devices 110, which are described herein in more detail, communicate over network 120 with one or more of a user device 130, and third party device 140. Network 120 may be any standard wireless network including (but not limited to) cellular networks, WLAN networks, Bluetooth networks, Zigbee, etc. User device 130 may be any personal computing device such as cellphone, tablet computer, lap top computer, desk top computer, smart TV, etc. Third party device 140 is any device or collection of devices supported by someone other than the user of standalone reordering device 110 for receiving a signal from the standalone reordering device 110 and in response reordering the inventory item as described herein.

Figure 2:
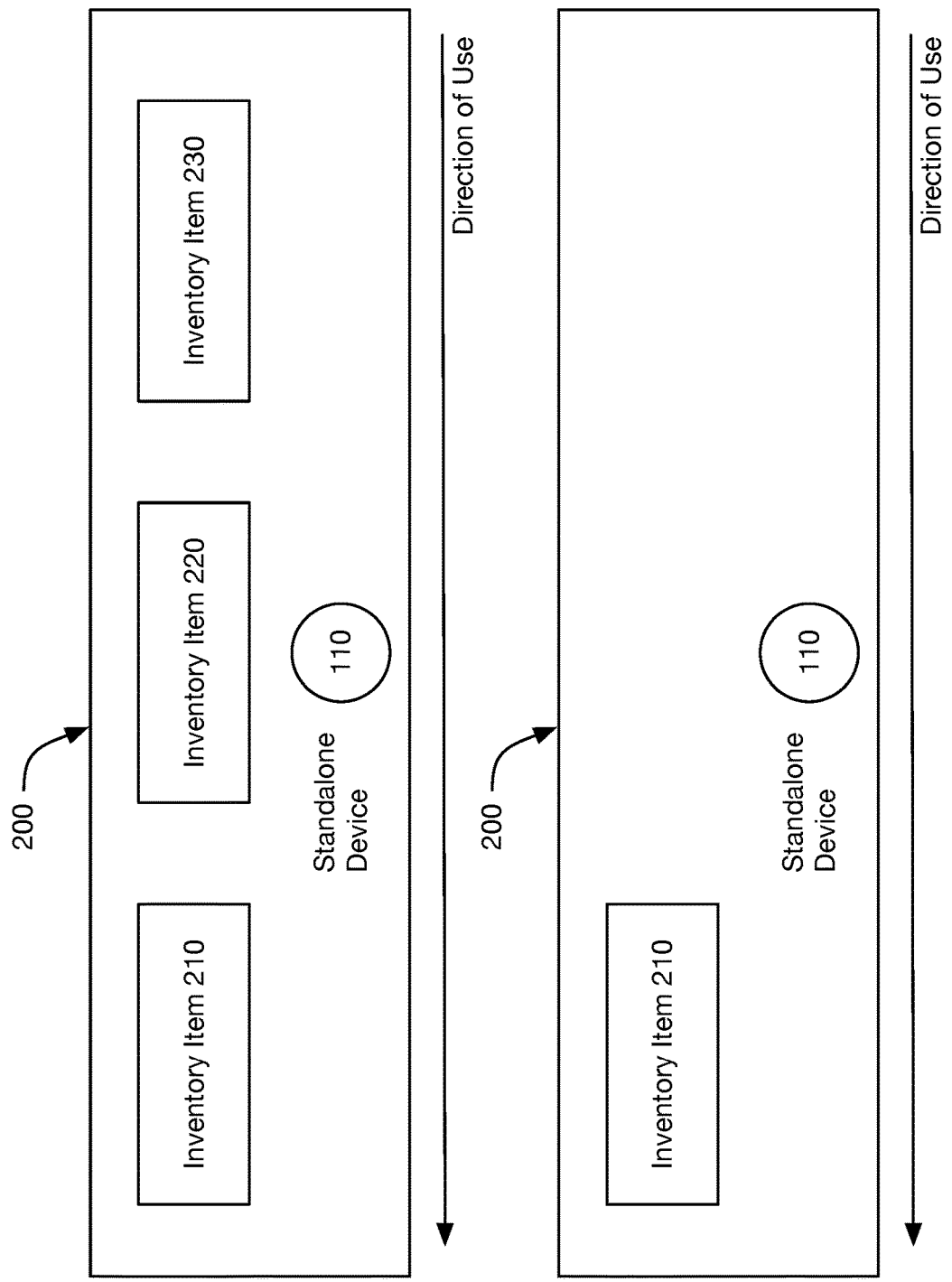
FIG. 2 is a block diagram illustrating an exemplary use of the standalone reordering device for practicing the methods described herein.

FIG. 2 depicts an embodiment of the method of using the standalone reordering device 110. Element 200 is, for example, a user's inventory or pantry. Inventory items 210, 220, and 230 are consumable inventory items that can be reordered using device 110 according to the methods described herein. Inventory items 210, 220, and 230 are placed in a row, although it is to be understood that any number of inventory items may be present and that they may be aligned in any arrangement. Referring again to FIG. 2, the items are used moving from left to right as in the order indicated by the arrow. Standalone reordering device 110 may be placed beneath, behind, above, beside, adjacent to, or otherwise engaged with one or more inventory items. The user of reordering device 110 places it at or near a location determined to be the point of depletion when the inventory item requires attention or reordering. For illustrative purposes only, the user may place reordering device 110 relative to the second to last inventory item, inventory item 220. Per the methods described herein, removing inventory item 220 is a triggering event causing reordering device 110 to transmit a signal to one or more of third party device 140 or user device 130.

The third party device 140 may be, for example, a vendor computing system for taking electronic orders to fulfill and ship a good to a customer. The vendor may be an exclusively or partially online merchant/e-commerce provider, or may alternatively be a traditional retailer or manufacturer providing an online or other electronic interface for customers to order a good from a brick-and-mortar physical location of the vendor. Alternatively, the third party device 140 may be a computing system of a broker, intermediary, or other service provider who receives purchase requests and either forwards the purchase requests to a vendor computing system, conditionally forwards the requests to a vendor computing system based on one or more factors (e.g., selecting a vendor from among several vendors, determining whether a purchase order should be immediately fulfilled or delayed, etc.), or aggregates, modifies, or otherwise processes purchasing orders before forwarding to a vendor computing system.

FIG. 3A depicts another embodiment of the method of using the standalone reordering device 110. In this embodiment, the standalone reordering device 110 is placed at the opening 330 of an enclosure 320. The enclosure is used for storing an inventory item 310. Enclosure 320 broadly may be any structure capable of containing an inventory item having a surface on which the standalone reordering device 110 may rest or be attached, examples include (but are not limited to) a cabinet, shelf, bottle, box, chamber, bag, or other type of container. The standalone reordering device 110, which is placed at the opening 330 of enclosure 320, senses a user reaching through the opening 330 or disturbing the inventory item 320 in some way. The sensed action is recorded by one or more of the standalone reordering device 110, user device, or third party device as a triggering event, which is necessary for initiating reordering of the inventory item.

Figure 3B:
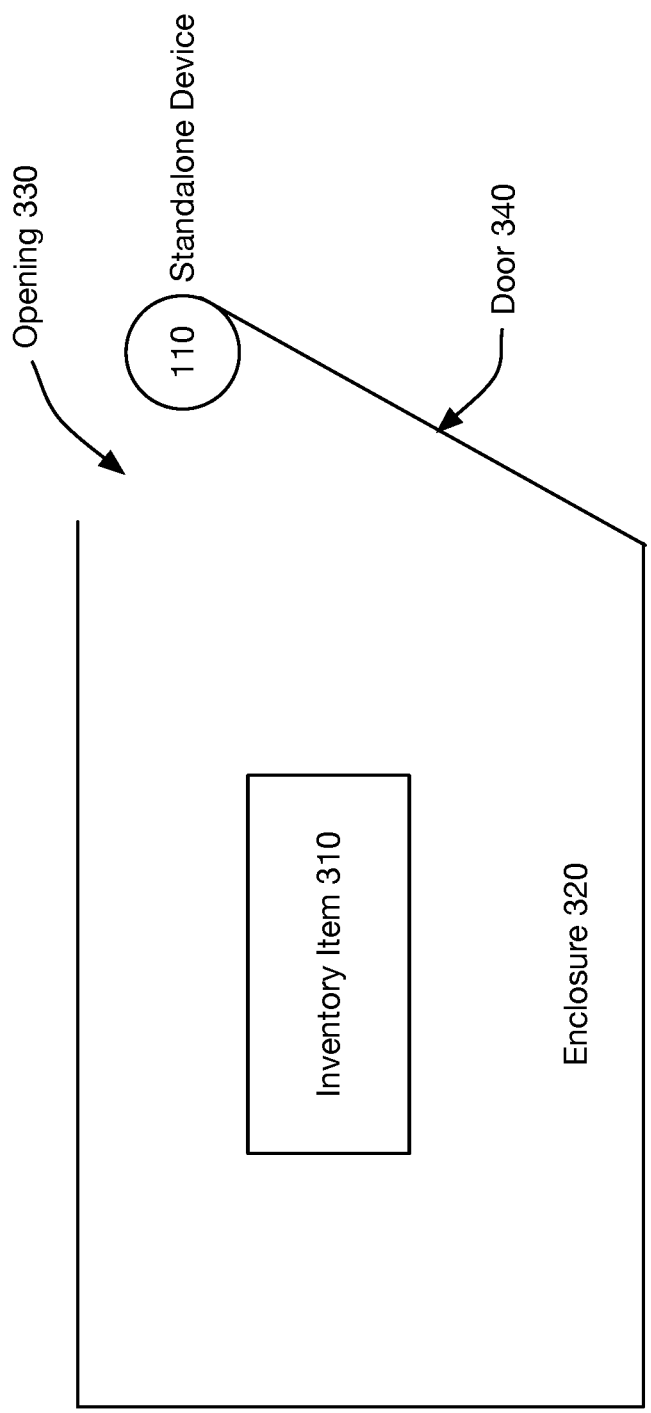
FIG. 3B is a flow chart illustrating a method for carrying out the method of reordering an inventory item as described herein.

FIG. 3B depicts another embodiment of a method of using the standalone reordering device 110. In this embodiment the standalone reordering device is at a place of movement for the enclosure. For example, FIG. 3B depicts the standalone reordering device attached to door 340 of enclosure 320. It should be understood that according to this embodiment the standalone reordering device can be placed anywhere in the enclosure where the reordering device will detect the enclosure's movement or other change in the enclosure. For example, the standalone reordering device may be placed at front, rear, or side of the enclosure. Additionally, the standalone reordering device may make full contact or indirect contact with the enclosure or a component of the enclosure such as a shelf, drawer, gear, wheel, or door. According to this embodiment, the standalone reordering device senses the movement or other change in the enclosure. In response, the standalone reordering device, user device, or third party device records a triggering event.

In another embodiment of the method of using the standalone reordering device, the device may contain an electronically connected mechanical switch such that the switch is in place by itself or in combination with one or more sensors. For example, FIG. 3B depicts the standalone reordering device attached to door 340 of enclosure 320. It should be understood that to this embodiment of the standalone reordering device can be placed in direct relation to the door 340 such that as the behavior of the door opening or closing actuates the electronically connected mechanical switch. Or working sequentially or in parallel, or both, the mechanical switch can be used either as a failsafe counting method or as a precursor to activating other sensor or sensors.

In another embodiment of the method of using the standalone reordering device, reordering device and an electronically connected mechanical switch are placed in direct relation to the inventory item itself. In this embodiment, the device may be placed inside an enclosure in a fixed location within such that filling the enclosure with an inventory item would depress the mechanical switch to a specific position other than its natural position; for example, depressed downward in a scenario of pet food containers. Depleting from the top down would cause the mechanical switch to release from its depressed position to its natural position and this mechanical change may be understood as a triggering event. It should be understood that the mechanical switch releasing from its position prior to depletion can be in any direction. For example, the switch of a container on its side may be understood as being in a forward position when the container is full, and returning to its natural position when it is empty.

In another embodiment of the method of using the standalone reordering device, the device may use a transducer, floating switch, or a combination of both, with or without additional sensors, placed within a content of liquid such that the physical change can be understood electronically (i.e., electrical impedance changes based upon the quantity of liquid). For example, with a floating switch, the device may be placed inside an enclosure in a fixed location within such that filling the enclosure with a liquid would cause the floating switch to float and such that if the liquid is removed or used to a point where the floating switch falls to the lowest position and would be understood as a triggering event.

In another embodiment of the method of using the standalone reordering device, the device may be placed at the bottom or along the side of an enclosure. In this embodiment, the user depletes the contents of the enclosure to the point of exposing the standalone reordering device, which the device recognizes is the triggering event. The device may detect the triggering event in a number of ways. For example, removing an item or a portion of its content in direct relation between the sensor and the item may cause a detectable change in one or more physical characteristics, including light intensity/brightness, electrical resistance or capacitance. The sensor may also recognize a change in weight on the standalone reordering device (or a surface in proximity to the standalone reordering device), or a change to magnet contact with the device. The device may also use an optical sensor that recognizes differences in luminance. Although the foregoing methods have been described generally with regard to one standalone reordering device, they may also be carried out by multiple networked devices as shown in FIG. 1. Additionally, the networked sensors may be different types of sensors, for example it may be useful to combine, a weight sensor with an optical sensor, as will be described further herein.

Figure 4A:
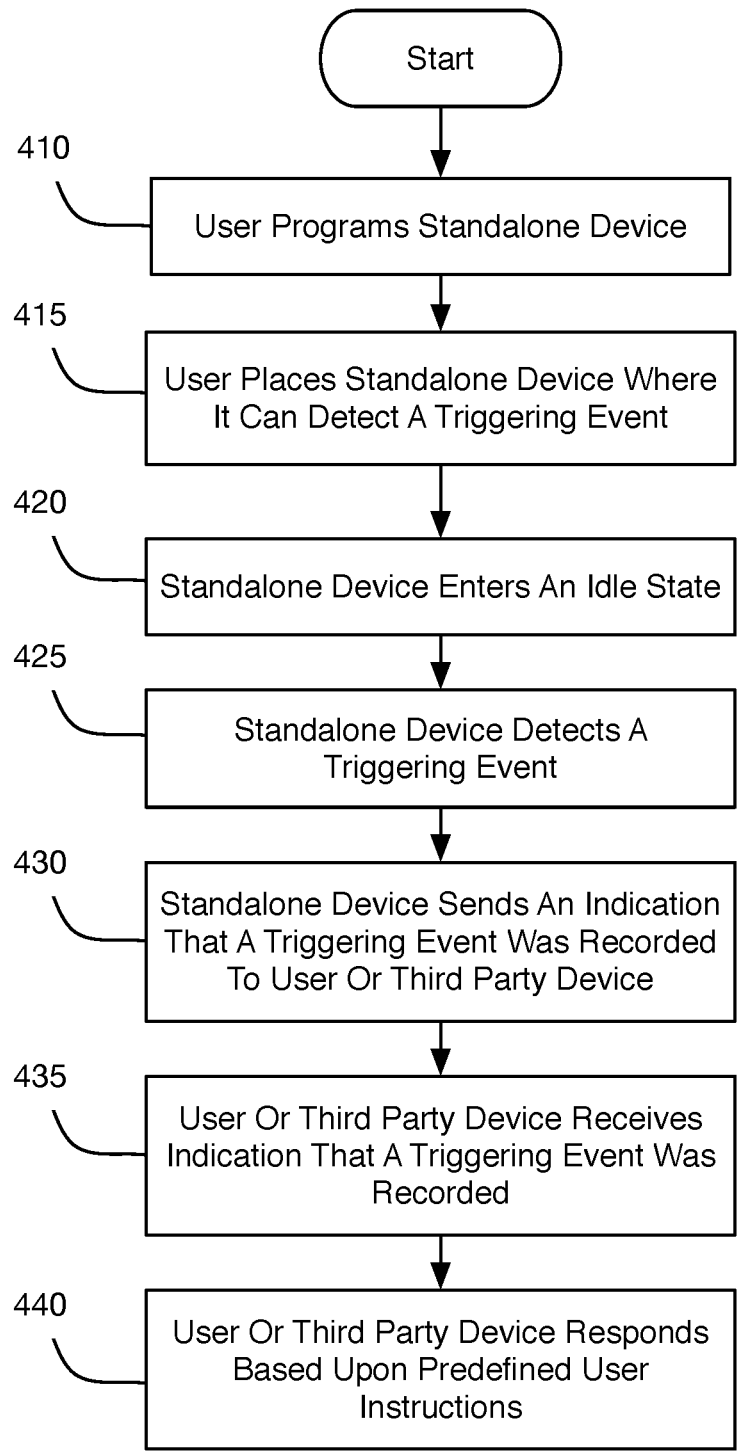
FIG. 4A is a flow chart illustrating an alternate method for carrying out the method of reordering an inventory item as describe herein.

FIG. 4A is a flow chart illustrating an embodiment of the method for reordering an inventory item. In Step 410, the user programs or reprograms the reordering device 110. The user may program the reordering device with information such as: identity of the inventory item that is being monitored; whether the device is monitoring depletion, whether the device will reorder the inventory item; whether the vendor should request information from the user about reordering; information about the third party necessary to complete the order; the amount of the inventory item to be ordered; whether the order should be shipped or held for pick-up. The user also may program security measures such as wireless encryption or password data. Additionally, a third party other than the user such as the manufacturer of the device, the inventory item manufacturer, or the retailer can program or reprogram the device before, at, or after the point of sales transaction for the device.

At Step 415, the user places the device at a point in proximity to the inventory item where triggering events are likely to be detected, for example as shown in FIGS. 2, 3A and 3B. At Step 420, the device enters an idle state. The device remains in an idle state until it detects a triggering event at Step 425. The triggering event may be a change in the inventory item's position, or a change at some point in the enclosure, container, housing or platform where the inventory item resides. At Step 430, after detecting a triggering event, the standalone reordering device transmits a signal to one or more of the user device or third party device.

At Step 435, the user device 130 or third party device 140 receives the signal. At Step 440, the user device or third party device responds based on the predefined user instructions, which were programmed at Step 410. For example, the third party device or user device may notify the user that an inventory item needs to be reordered. Such notifications may be sent to the user in one of several ways, for example, as a text message (SMS), email, be added to the user's digital shopping cart, or some other electronic means. In another example the user device or third party device may request instructions from the user such as a request to confirm, cancel, or delay an order for a period of time or pending further instructions. In another example the user device or third party device may execute a pre-set instruction by the user such as to reorder the inventory item and ship the inventory items immediately, ship the inventory items pending free-shipping requirements, or prepare the inventory items for pick up at a vendor(s) physical location.

Figure 4B:
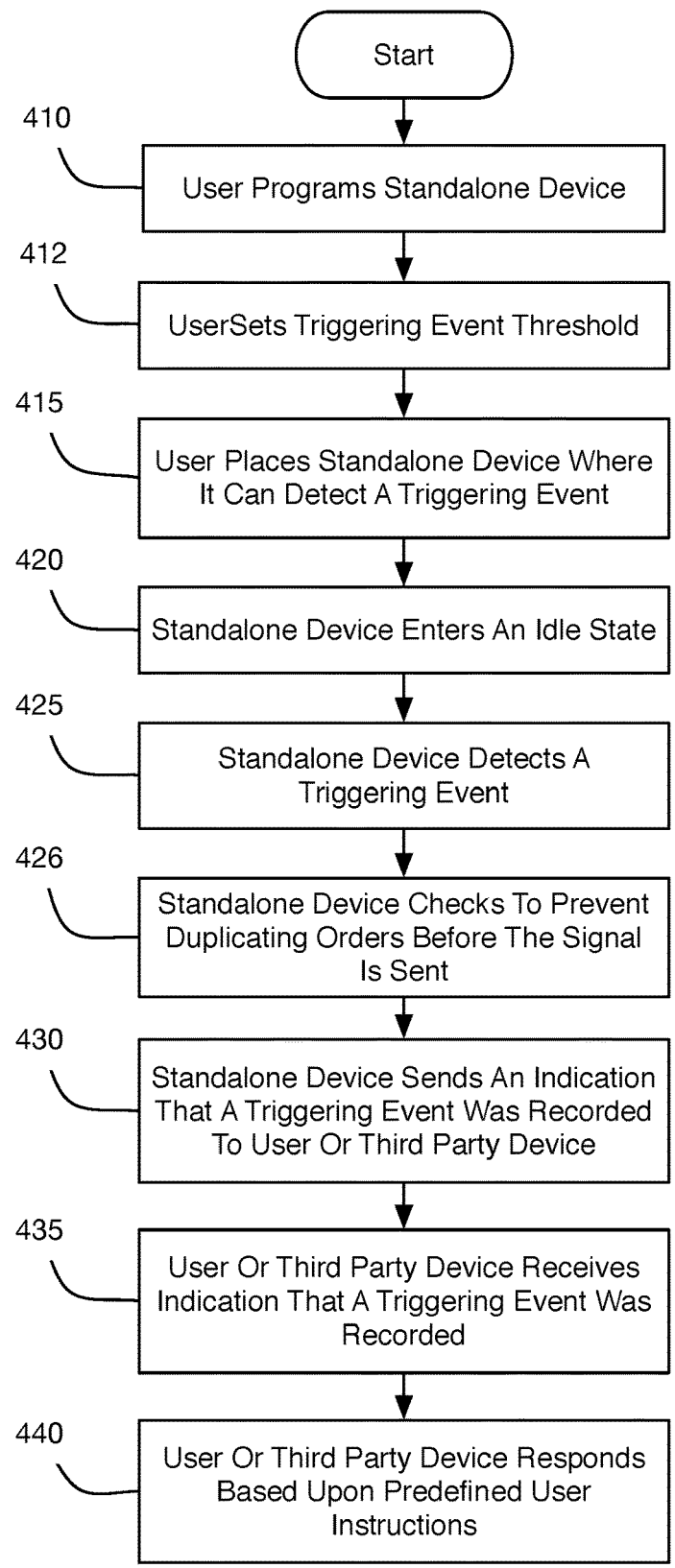
FIG. 4B is a flow chart illustrating an alternate method for carrying out the method of reordering an inventory item as describe herein.

FIG. 4B is flow chart illustrating another embodiment for carrying out the method of reordering an inventory item. In Step 426, the reordering device checks to prevent duplicating orders. The reordering device may perform this check for example by comparing historical usage data of the inventory item collected from one or more previous triggering events to this triggering event, for example, by comparing the relative timing of the events. The reordering device may also check against any open, pending, or undelivered orders. If based on these checks the reordering device detects an unusual ordering pattern, it may, for example, request user instructions, notify the user of the unusual activity or delay reordering until confirmation is received.

Figure 4C:
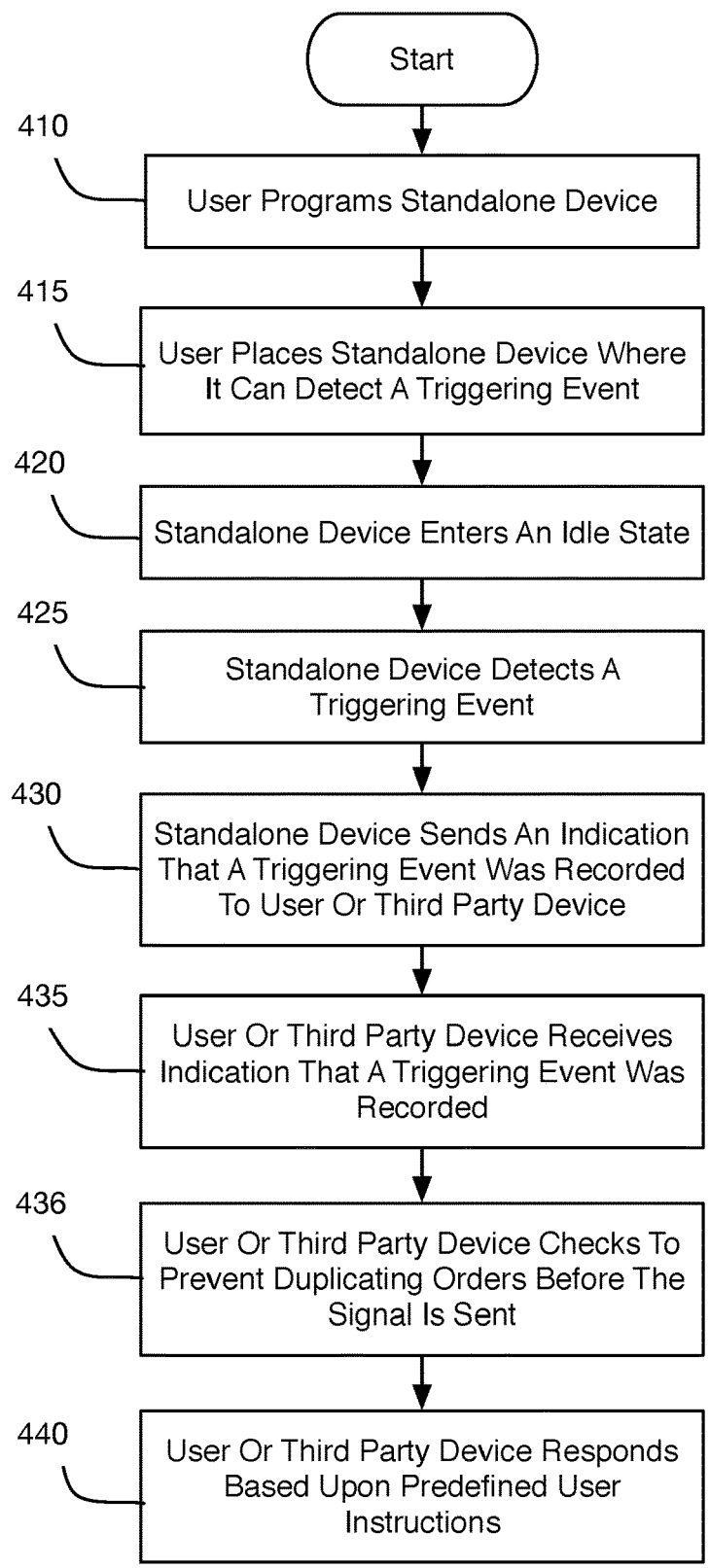
FIG. 4C is a flow chart illustrating an alternate method for carrying out the method of reordering an inventory item as describe herein.
Figure 5:
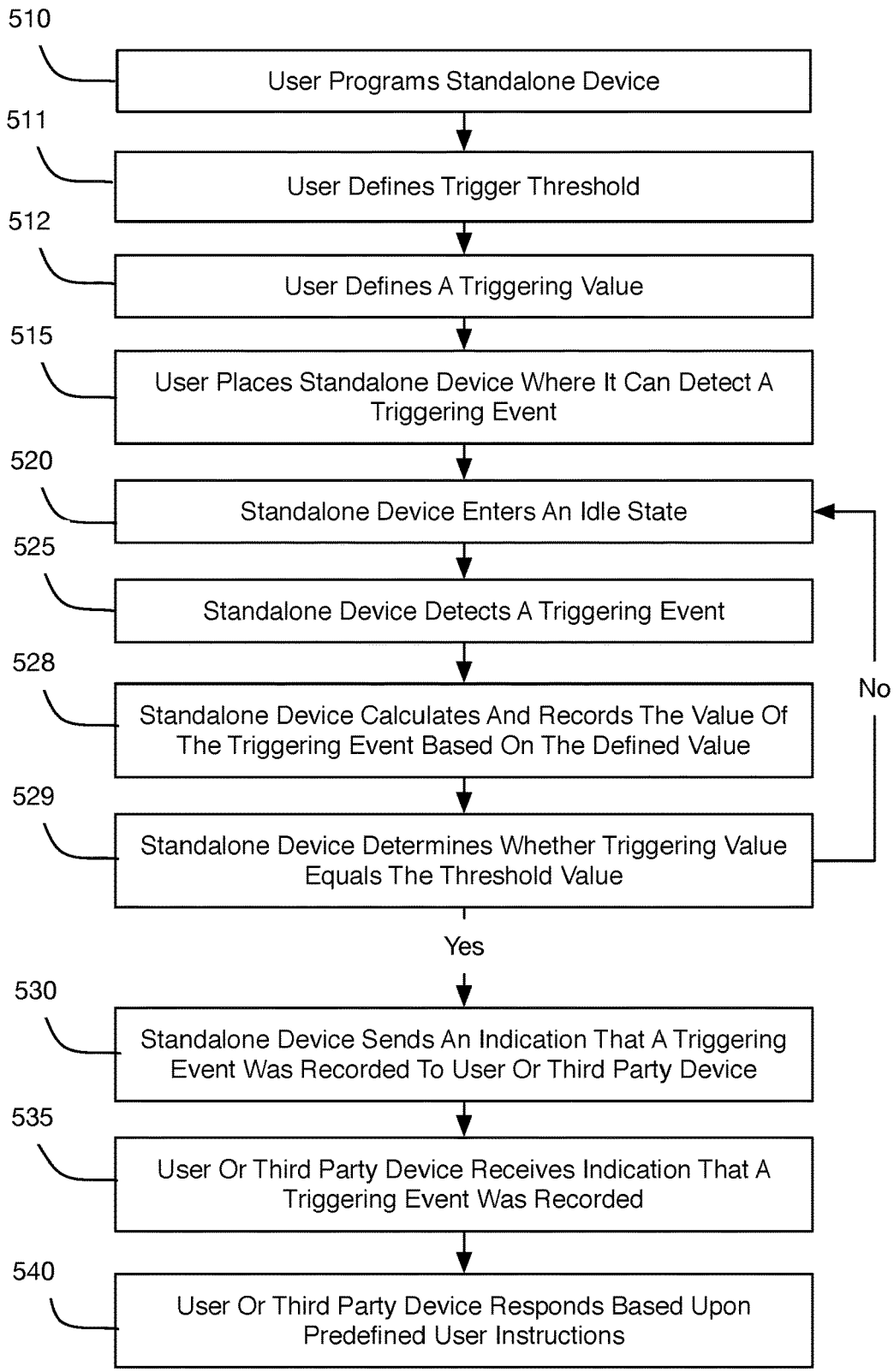
FIG. 5 is a flow chart illustrating an alternate method for carrying out the method of reordering an inventory item as describe herein.

FIG. 4C is a flow chart illustrating another embodiment of method for reordering an inventory item. In Step 436, the user device or third party device checks to prevent duplicating orders. The user device or the third party device may perform this check for example by comparing historical usage data of the inventory item collected from one or more previous triggering events to this triggering event based for example by comparing relative timing of the events. The user device or third party device may also check against any open, pending, or undelivered orders. If based on these checks the user device or third party device detects an unusual ordering pattern, it may, for example, request user instructions, notify the user of the unusual activity or delay reordering until confirmation is received FIG. 5 further illustrates an embodiment for defining and recording a triggering event for reordering of an inventory item. The methods for defining and recording a triggering event as illustrated in FIG. 5 may be applied to the standalone reordering device 110, a user device 130, or a third party device 140. In Step 511, a user programs the standalone device to define a triggering event. The discussion above has provided several illustrative examples of triggering events. Broadly, however, a triggering event, is any movement or disturbance to an inventory item or its enclosure that is detected by the standalone reordering device that can be used to indicate consumption of an inventory item such that it needs to be reordered. The definition of a triggering event may be programmed by the user or may be preprogrammed into the standalone reordering device.

Step 512 allows a user to define the number of triggering events that must be recorded before the device reorders the inventory item—a trigger threshold. Considering for example laundry detergent, a household may program the standalone reorder device to record more triggering events before it reorders the detergent, than a commercial launderer. This may be because the household has less need for multiple bottles of detergent, or it maintains fewer bottles of laundry detergent in stock, or it will use a bottle of laundry detergent over a period of time. Accordingly, the user may program the standalone reordering device, user device, or third party device to reorder detergent after multiple triggering events, corresponding to multiple uses of the detergent. As a more specific illustration, for a bottle of laundry detergent with a 64-load capacity, the user may program the standalone reordering device, user device, or third part device to record 58 triggering events before finally executing the reorder scheme.

In another example, considering an embodiment where the triggering event is exposure of the standalone reordering device, the user may set a trigger threshold of greater than one because the container is expected to be refilled. Additionally, in the case where multiple sensors of different types are used, the system of sensors may be programmed to recognized different triggering events. For example, the standalone reordering device could use an optical sensor to detect depletion and a weight sensor is used to detect replenishment. This provides failsafe measures to avoid false-positive trigger thresholds. For example, the user could set the trigger threshold to require recording two triggering events from the optical sensor, separated by a single triggering event from the weight sensor.

In another example the user may program the standalone reordering device, user device or third party device, to ignore a set of triggering events. For example, in the case of a standalone trigger event attached to a door, the device may detect one triggering event when the door is opened and another when it is closed. Another example will be a washer or dryer where the door is opened once to load the machine before the cycle and another time to unload it after a cycle. In each of these examples, the standalone device will detect more triggering events than uses of the item. These extra triggering events must be disregarded to maintain an accurate estimate of item usage. It should also be understood that the term of an item being used or consumed is applied broadly; the consumption of an inventory item may be direct, such as a person drinking or eating, or may be indirect such as a person initiating consumption through an intermediary object such as oil in a lawnmower, tires on a car, bearings on a tool or a die in a machine. Albeit these aforementioned items are consumed at a slower rate, it should also be understood that consumption occurs in a variety of ways, some seemingly indirectly.

In another example, the user may define the triggering event to have a value other than one—the triggering value (also referred to herein as an inventory depletion value per user disturbance). For example, the user may program the device to record a triggering event to have an integer or fractional value in order to fine-tune the value of each triggering event. For example, in the above scenario, instead of programming the device to ignore a set of trigger events, the user may instead program the device to assign a triggering value of 0.5 to each triggering event. In another example, consider the use of sugar packets. A user lives in a two-person household where one member uses 1 packet per cup of coffee and the other uses 2. A user may place the standalone reordering device at the enclosure's opening, which contains 500 packets of sugar, and program the device to account for the households known behavior. For example, the user may want to reorder sugar packets after 480 packets had been used. Accordingly, the user can designate the triggering event to have a value of 1.5 so that two detections of the triggering event to the total trigger values recorded is 3, and that after 320 trigger counts the total trigger values recorded is 480, thereby initiating the reordering scheme. In another example, a household may consist of two members where the first member consumes 1 pack of sugar twice daily and the second consumes 2 packs of sugar twice daily resulting in two users reaching in to remove a quantity of sugar packets a total of four times a day. The user would then be able to account for the expect usage of 6 packs of sugar over 4 triggering event and therefore assign a triggering value of 1.25. Accordingly, since sugar is reordered after 480 packets are used, the reorder process is initiated when the total triggers recorded equals 384.

Referring now again to FIG. 5, the method may also include Steps 528 and 529. In Step 528, one or more of the standalone reorder device, the user device, or the third party device records the triggering event and may also maintains the total event count. It calculates the total triggers recorded using the triggering value multiplied by each triggering event or the total event count. At Step 529, the device determines whether the total triggers recorded equals the trigger threshold programmed by the user. If it does not, the method returns to Step 520. If it does, the method advances to Step 530.

In another aspect of the method of programming a triggering value, the standalone reordering device, user device, or third party device may calculate the average consumption over a plurality of triggering events and calculate the average triggering value. According to one aspect of this embodiment the automatic reorder device is suspended for a time while the triggering value is calculated. As an example, a user may manually reorder the inventory item for a period, and the device will record the number of triggering events between requests to reorder the item. This method may be useful in an office setting, for example, where there are many people, each having different consumption habits for sugar because initially the system and/or the user may not know the appropriate triggering value to assign. According to this method, the standalone reordering device is placed into an idle state where it will continue to record triggering events but will not initiate the reorder scheme. As such the device will track total event count for a container of 500 packets of sugar pending a user manually reordering the sugar. If the user manually initiates the reordering process at a total event count of 200 triggering events, the system will calculate and display to the user that the triggering value should be 2.5. According to another aspect of this embodiment the standalone reordering device, user device, or third party device, may determine the average consumption by calculating the number of triggering events per unit time before the trigger threshold is reached, and may modify the triggering value and/or the total triggers recorded for reordering over time.

Figure 6A:
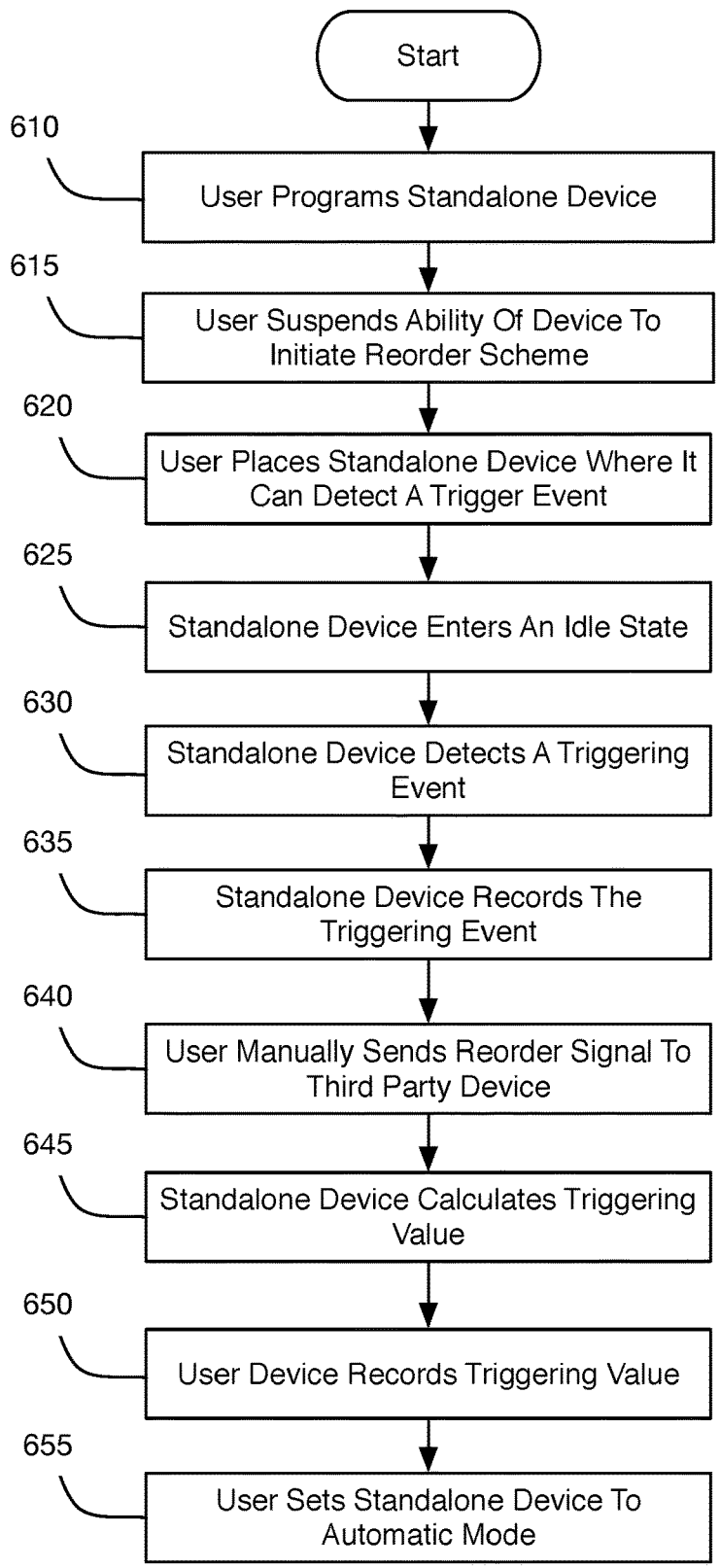
FIG. 6A is a flow chart illustrating an alternate method for carrying out the method of reordering an inventory item as describe herein.

This method is illustrated in FIG. 6A. In Step 610, the user programs the standalone reordering device as is discussed herein. In Step 615, the user suspends the ability of the standalone device to automatically reorder an inventory item. In Step 620, the user places the standalone device in an area where it will detect a trigger event, as is discussed herein. In Step 625, the standalone device enters an idle state, as discussed herein. In Step 630, the device detects a triggering event. In Step 635, the device records the triggering event. In Step 640, the user manually sends a reorder notification to the third part device. In Step 645, the device calculates the triggering value based on the trigger threshold and the total event count. At Step 650, the device records the trigger threshold and triggering value. At Step 655, the user places the standalone device into automatic reorder mode. At this point the device functions substantially according to the method discussed in Steps 520-540 of FIG. 5.

Figure 6B:
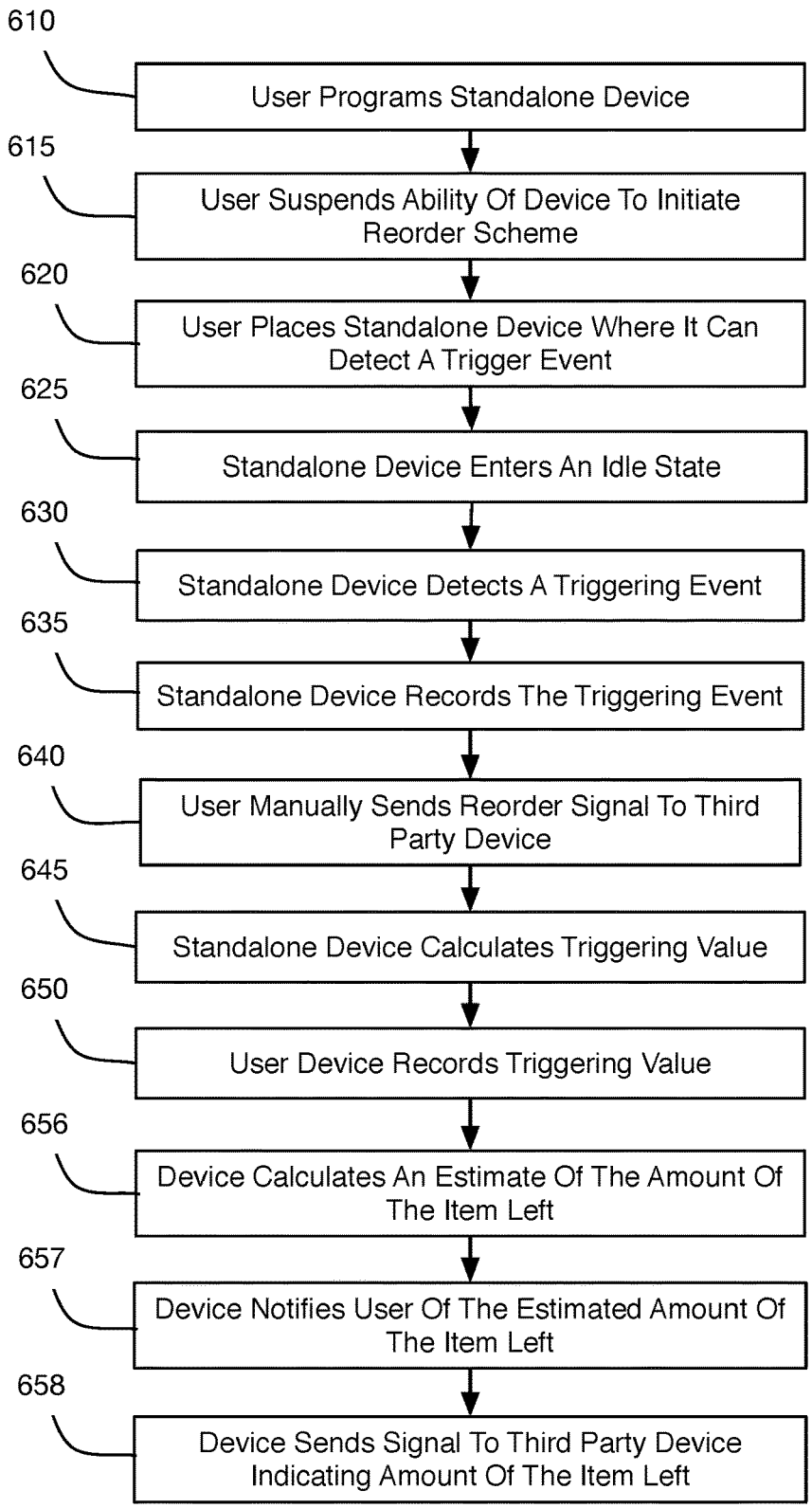
FIG. 6B is a flow chart illustrating an alternate method for carrying out the method of reordering an inventory item as described herein.

FIG. 6B illustrates another embodiment of the method of using the standalone reordering device. The method of FIG. 6B is similar to the above described method of FIG. 6A, but includes Step 656, where the standalone reordering device estimates the amount of inventory remaining. An exemplary method calculates the likely number of sugar packets and converts the number to the number of triggers that will be registered before the supply is exhausted. That number is then decreased by the number of actual triggering values recorded. For example, consider a situation where the last order was for 500 packets of sugar and the user added 50 sugar packets left over from the previous order. The starting value of packets is 550, and the number of triggering values that must be recorded before the sugar packet is used up is the 550 divided by the triggering value. If the triggering value is 2 then it will take 275 triggering events before all of the sugar is used. To estimate the amount of sugar currently available the number of triggering events recorded is subtracted from the number of triggering events available. So in the above example, if the total events count is 10 and the triggering value is 2, then there are 255 triggering events left, which corresponds to 510 packets of sugar. A person of ordinary skill in the art would understand that there are methods for estimating the number of items available, including methods using fuzzy logic.

The method also includes Step 657 where the device notifies the user of the estimated amount of the item to the user, for example using a display. The method also includes a Step 658 where the device sends an indication of the estimated amount of the item to a third party device. This may useful to both the user of the device and to a vendor of the item. For example, it could be used to forecast consumption, for dietary tracking, to estimate upcoming expenses, to plan inventory needs. Additionally, a vendor that has access to the estimated amount of the items left can send information to the user that may be of interested based on the upcoming need to replace the inventory item. For example, the vendor may notify the user of an upcoming sale that will occur now or in the future.

The foregoing methods have been described with certain tasks taking place on one of the standalone reordering device, the user device, or the third party device. It is not the intent of the invention to define which function needs to run on which device. Instead, a person of ordinary skill in the art will know that functions may be spread over one or more devices, and may be duplicated on one or more devices. For example, programming the item to be reordered may be done on any one or more of the devices. The same is true for programming the trigger value, the trigger threshold, the total event count, the total triggers recorded, and the automatic initiation of a reorder.

Figure 7:
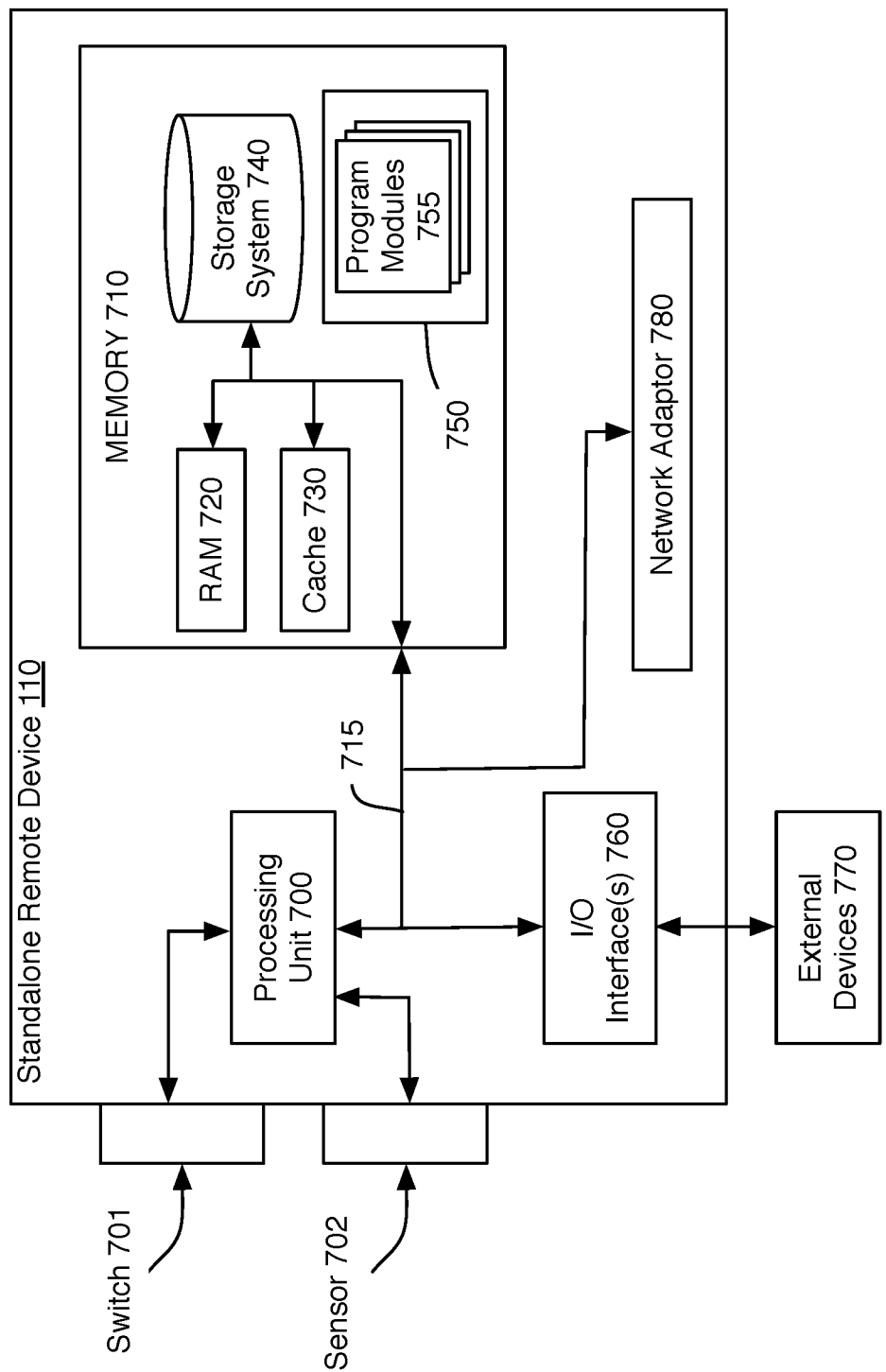
FIG. 7 is a block diagram of a standalone reordering device that may be utilized to implement various features and processes described herein.

FIG. 7 is a block diagram of the reordering device. Although not shown, it should be understood that the device may also have a display screen. The display screen can display any information that may be useful to the user of the device. For example, it may show the estimated amount of the item. Although it should also be noted that the display screen may be on the user device, or third party device. The information may be presented using an app or web browser, or other program capable of displaying the information of interested. The display screen may be used as a programming interface allowing the device or module to be programmed as described herein.

Referring again to FIG. 7, instead of or in addition to the display screen, the standalone reordering device 110 may possess one or more input devices 701 that could be a button, switch, or sensor, or other input device. The input device is distinct from the sensor 702 that detects triggering events. Input device 701 may control one or more functions such as but not limited to, powering on, powering off, cancelling the last registered triggering event and or temporarily suspending recording triggering events, clearing local and/or remote total event count, or other useful functions. It may also be used to program the standalone device. For example, pressing a button for 1 second might temporarily suspend sending trigger event to a user device or third party device; pressing it for 3 seconds would cancel the last trigger; pressing it for 5 seconds would turn the device on or off. Such functions are useful in the event a trigger was accidentally set off. For example, the user may need to move inventory item and/or the device, but intends on having the sensor reactivate at a later time. In this situation it is useful for the user to be able to turn off (and on) the device as necessary, or to clear the cache of total trigger counts logged if in the interim the user purchased or found additional inventory.

Additionally, the button 701 may be used to add a fixed or variable quantity to the trigger threshold. For example, pressing the button 5 times in succession or holding the button for 5 seconds may add a fixed trigger value to the trigger threshold. In another example, pressing the button three times in succession or holding it for three seconds will allow the user to then increase the trigger threshold a variable number of times by adding that amount to the number of triggers the subsequent number of times the button is pushed. Additionally, the button may force the device to reach the trigger threshold. Also, the buttons may be used as a failsafe against accidental overrides. For example, the device may require activation of two buttons, either sequentially or at the same time, or for a period of time to initiate the override, an otherwise programmed action.

These are intended to be examples only, a person of ordinary skill in the art may recognize other useful functions that the buttons can be programmed to accomplish. As these are intended to be examples only, it should be understood that a personal of ordinary skill in the art may recognize other useful functions can be actualized by incorporating additional buttons, sensors, switches, transducers, or combinations of two or more sensors or inputs. It should be understood, however, that it is not the intent of the invention that button 701 should be programmable to allow for reordering without first reaching the trigger threshold. Further, by having such at least one failsafe, it would be possible for the user to intentionally engage buttons to place more than one order for the preset quantities by forcing a device to reach the trigger as many times as they like. This would be particularly useful, for example, if additional supplies were anticipated to be needed for an upcoming celebration or event.

As referenced above, standalone reordering device 110 also includes a sensor 702 for detecting a trigger event. Such sensors include but are not limited sensors known in the art for detecting changes in infrared light, visible light, weight, temperature, motion, heat, fingerprint or other biometric signifier, or voice. Note too that sensor 702 may be a switch capable of detecting the trigger event.

FIG. 7 is a high level block diagram of a representative standalone reordering device that may be utilized to implement various features and processes described herein. Standalone reordering device 110 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 7, standalone reordering device 110 is illustrated in the form of a special purpose computer system. The components of standalone reordering device 110 may include (but are not limited to) one or more processors or processing units 700, a system memory 710, and a bus 715 that couples various system components including memory 710 to processor 700.

Bus 715 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 700 may execute computer programs stored in memory 710. Any suitable programming language can be used to implement the routines of particular embodiments including C, C++, Java, assembly language, etc. Different programming techniques can be employed such as procedural or object oriented. Further, multiple processors 700 may be used.

Standalone reorder device 110 typically includes a variety of computer system readable media. Such media may be any available media that is accessible by standalone reorder device 110 and it includes both volatile and non-volatile media, removable and non-removable media.

System memory 710 can include computer system readable media in the form of volatile memory, such as random access memory (RAM) 720 and/or cache memory 730. standalone reorder device 110 may further include other removable/non-removable, volatile/non-volatile computer system storage media. By way of example only, storage system 740 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 715 by one or more data media interfaces. As will be further depicted and described below, memory 710 may include at least one program product having a set (e.g., at least one) of program modules that are configured to carry out the functions of embodiments described in this disclosure.

Program/utility 750, having a set (at least one) of program modules 755, may be stored in memory 710 by way of example, and not limitation, as well as an operating system, one or more application software, other program modules, and program data. Each of the operating system, one or more application programs, other program modules, and program data or some combination thereof, may include an implementation of a networking environment.

Standalone reorder device 110 may also communicate with one or more external devices through Input/Output interface 760 for such purposes as upgrading or downgrading firmware, programming security protocols or security countermeasures, or connection to a wired power source for the recharging of an internal power source.

In addition, as described above, standalone reorder device 110 can communicate with one or more wireless networks 120 via network adaptor/transceiver 780. As depicted, network adaptor/transceiver 780 communicates with other components of standalone reorder device 110 via bus 715. It should be understood that although not shown, other hardware and/or software components could be used in conjunction with standalone reorder device 110. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An inventory management system, comprising:
   one or more electronic sensors;
   one or more processors coupled to the one or more electronic sensors; and
   non-transitory memory storing instructions that, when executed by a processor of the one or more processors, cause the processor to:
      identify an inventory comprising a plurality of countable items of a same type which are consumed by one or more users,
      automatically determine, via a motion-detecting capability of at least one of the one or more electronic sensors and during a first interval of time, occurrence of a plurality of enclosure entry events, each enclosure entry event indicating that at least a part of any user of the one or more users has entered an enclosure storing the inventory,
      store an inventory depletion value per enclosure entry event, wherein the inventory depletion value per enclosure entry event is set in response to a determination that during a second interval of time before the first interval of time, one or more previous enclosure entry events had decreased the inventory by a number of the countable items other than one, and wherein the inventory depletion value per enclosure entry event is based at least in part on a ratio of a total measured change in inventory and a total number of enclosure entry events during the second interval of time, calculate, based on the inventory depletion value per enclosure entry event and on a count of the plurality of enclosure entry events during the first interval of time, an estimated change in inventory level during the first interval of time, in response to the determining the occurrence of the plurality of enclosure entry events and determining that the estimated change in inventory level is greater than a stored threshold amount, transmit to a computing system a request to purchase one or more items of the same type as the plurality of countable items, and automatically determine that an abnormal pattern of purchase requests has been generated by the system, and wherein the transmission of the request to purchase the item is delayed, responsive to the determination that an abnormal pattern of purchase requests has been generated, until after any user authorizes the transmission of the request to purchase the item.

2. The system of claim 1, wherein the stored threshold amount is automatically determined based on a user's history of manually reordering to refill inventory.

3. The system of claim 1, wherein determination of an occurrence of a enclosure entry event comprises automatically determining, via at least one of the one or more electronic sensors, that an item from the plurality of countable items in the inventory has been physically moved by any user.

4. The system of claim 3, wherein the determination that the item from the plurality of countable items in the inventory has been physically moved by any user comprises detecting, using at least one of the one or more electronic sensors, a change in weight indicative that the item is no longer present.

5. The system of claim 3, wherein the determination that the item from the plurality of countable items in the inventory has been physically moved by any user comprises determining that the item no longer blocks at least one of the one or more electronic sensors from receiving light from a light source.

6. The system of claim 3, wherein the determination that the item from the plurality of countable items in the inventory has been physically moved by any user comprises determining that the item no longer maintains a position of an electronically connected switch.

7. The system of claim 1, wherein the instructions, when executed by the processor, further cause the processor to:
transmit, to the computing system, an estimated count of items that remain from the plurality of countable items in the inventory, and
receive, from the computing system, an offer to sell items of the same type as the plurality of countable items.

8. The system of claim 1, wherein a single, standalone computing device comprises the one or more electronic sensors, the one or more processors, and the non-transitory memory, and wherein the single, standalone computing device is moveable within an enclosure storing the plurality of inventory items.

9. The system of claim 1, wherein the inventory depletion value per enclosure entry event is a number greater than or less than 1.

10. A computer-implemented method for maintaining an inventory, comprising:
identifying an inventory comprising a plurality of countable items of a same type which are consumed by one or more users;

automatically determining, using a motion-detecting capability of one or more electronic sensors coupled to a standalone computing device and during a first interval of time, occurrence of a plurality of enclosure entry events, each enclosure entry event indicating that at least a part of any user of the one or more users has entered an enclosure storing inventory;

storing an inventory depletion value per enclosure entry event, wherein the inventory depletion value per enclosure entry event is set in response to a determination that during a second interval of time before the first interval of time, one or more previous enclosure entry events had decreased the inventory by a number of the countable items other than one, and wherein the inventory depletion value per enclosure entry event is based at least in part on a ratio of a total measured change in inventory and a total number of enclosure entry events during the second interval of time, calculating, based on the inventory depletion value per enclosure entry event and on a count of the plurality of enclosure entry events during the first interval of time, an estimated change in inventory level during the first interval of time, in response to determining the occurrence of the plurality of enclosure entry events and determining that the estimated change in inventory level is greater than a stored threshold amount, transmitting, from the standalone computing device to another computing device a request to purchase one or more items of the same type as the plurality of countable inventory items, and automatically determining that an abnormal pattern of purchase requests has been generated by the standalone computing device, and wherein the transmission of the request to purchase the item is delayed, responsive to the determination that an abnormal pattern of purchase requests has been generated, until after any user authorizes the transmission of the request to purchase the item.

11. The computer-implemented method of claim 10, wherein the stored threshold amount is automatically determined based on a user's history of manually reordering to refill inventory.

12. The computer-implemented method of claim 10, wherein determination of an occurrence of an enclosure entry event comprises automatically determining, using at least one of the one or more electronic sensors, that an item from the plurality of countable items in the inventory has been physically moved by any user.

13. The computer-implemented method of claim 12, wherein determination that the item from the plurality of countable items in the inventory has been physically moved by any user comprises detecting, using at least one of the one or more electronic sensors, a change in weight indicative that the item is no longer present.

14. The computer-implemented method of claim 12, wherein determination that the item from the plurality of countable items in the inventory has been physically moved by any user comprises determining that the item no longer blocks at least one of the one or more electronic sensors from receiving light from a light source.

15. The computer-implemented method of claim 12, wherein determination that the item from the plurality of countable items in the inventory has been physically moved by any user comprises determining that the item no longer maintains a position of an electronically connected switch.

16. The computer-implemented method of claim 10, further comprising:

transmitting, to a computing system, an estimated amount count of items that remain from the plurality of countable items in the inventory, and receiving, from the computing system, an offer to sell items of the same type as the plurality of countable items.

17. The method of claim 10, wherein the standalone computing device comprises the one or more electronic sensors, and wherein the standalone computing device is moveable within an enclosure storing the plurality of inventory items.

18. The method of claim 10, wherein the inventory depletion value per enclosure entry event is a number greater than or less than 1.

* * * * *